United States Patent [19]

Pauley

[11] 4,447,325

[45] May 8, 1984

[54] VERTICAL PRE-DEWATERING SCREEN

[75] Inventor: General J. Pauley, Roanoke, Va.

[73] Assignee: Gala Industries, Inc., Eagle Rock, Va.

[21] Appl. No.: 444,875

[22] Filed: Nov. 29, 1982

Related U.S. Application Data

[63] Continuation of Ser. No. 229,054, Jan. 27, 1981, abandoned.

[51] Int. Cl.³ ...................... B01D 25/30; B01D 23/20; B01D 39/12
[52] U.S. Cl. .................................. 210/295; 210/320; 210/434; 210/456; 210/499
[58] Field of Search ............... 210/213, 214, 247, 320, 210/377, 405, 433.1, 434, 456, 499, 295, 340, 341, 253

[56] References Cited

U.S. PATENT DOCUMENTS

| 139,645 | 6/1873 | Adney | 210/456 |
|---|---|---|---|
| 1,188,280 | 6/1916 | Kuenzli | 210/433.1 |
| 1,207,625 | 12/1916 | Ritchey | 210/456 |
| 1,447,660 | 3/1923 | Heller | 210/456 |
| 1,510,058 | 9/1924 | Heller | 210/433.1 |
| 1,653,473 | 12/1927 | Schulz | 210/433.1 |
| 2,463,814 | 3/1949 | Skinner | 210/433.1 |
| 2,906,402 | 9/1959 | Blankevoort | 210/405 |
| 3,530,986 | 9/1970 | More | 210/456 |
| 3,720,316 | 3/1973 | Riesbeck | 210/456 |
| 3,782,555 | 1/1974 | Solum | 210/456 |
| 4,120,790 | 10/1978 | Tinker | 210/456 |

FOREIGN PATENT DOCUMENTS

| 1305870 | 11/1961 | France | 210/456 |

Primary Examiner—Ernest G. Therkorn
Attorney, Agent, or Firm—Harvey B. Jacobson

[57] ABSTRACT

A solid-liquid separator comprising a vertical dewatering chamber enclosed by an outer foraminous wall or screen through which the slurry is passed so as to remove the liquid and return the solids within the dewatering chamber. The incoming slurry is deflected and directed into the screen by a stationary X-shaped plate baffle. Solids which cannot pass through the screen and remaining water, flow by gravity out the bottom of the dewatering chamber and onto a further dewatering screen.

5 Claims, 3 Drawing Figures

VERTICAL PRE-DEWATERING SCREEN

This application is a continuation of application Ser. No. 229,054, filed Jan. 27, 1981, now abandoned.

BACKGROUND OF THE INVENTION

1. Field of the Invention

This invention relates to apparatus for separating solids such as plastic pellets, from fluids or liquids mixed therewith to form a slurry. More particularly, the present invention is concerned with improvements in stationary dewatering screens for the purpose of removing a large portion of a liquid from a liquid-solid slurry.

2. Description of the Prior Art

One of the problems associated with separating liquids from solids by the use of a separating screen involves the blockage of the screen with solid matter which accumulates within the pores of the separating screen and thus greatly reduces the separation efficiency. U.S. Pat. No. 1,525,449, issued Feb. 10, 1925 to Johnson, attempts to solve this problem by directing a current of the materials to be strained directly across the face of the strainer whereby the accumulation of solid matter is prevented. The Johnson patent utilizes a strainer in the form of a cylinder and provides a turbine mixer positioned at about the center of the cylinder for directing a current of materials to be strained along substantially the entire face of the cylindrical surface, thus inserting rapid straining action and also preventing accumulation of solid matter on the strainer. The solution to the problem of clogged screens proposed in the Johnson patent, however, just creates a further problem since the moving turbine structure of the patent would be costly to assemble and more than likely would require constant maintenance. Another problem which is not recognized by Johnson is that by forcing the material against the screen, solid matter which would not ordinarily pass through the pores of the screen may be directed at such force so as to be driven into the pores of the screen. U.S. Pat. No. 2,133,974, issued Oct. 25, 1938 to Cowles, discloses a separating apparatus adapted for the treatment of solids suspended or entrained in a liquid. One of the objects of the invention of the Cowles patent is to provide a relatively small inexpensive apparatus which will perform an efficient separation without the use of moving parts. The Cowles patent provides a plurality of blades set edgewise to the flow of material entering a separation chamber with the faces of the blades parallel to the axis of flow. Large pieces of solid matter which do not pass through the space between the blades impinge on the blades and are deflected out of the path of flow, sliding along the blades under the combined influence of the force of the flow and gravity. A separating device similar to the Cowles patent is disclosed in U.S. Pat. No. 2,090,997, issued Aug. 24, 1937 to French for the purpose of eliminating refuse such as leaves, twigs, etc. from the water passing from the eave trough of a roof of a building to a storage tank or sewer. The French patent also utilizes a baffle plate which directs the refuse such as the leaves, twigs, etc. with a flow of water, the water passing through openings in the baffle plate while the refuse is directed to an opening out of the flow path of the water. The dewatering screen of the present invention is unlike the separating apparatus of French and Cowles since in the present invention means are provided to deflect the slurry from the incoming flow path into a dewatering screen in which the solid particles too large to pass through the screen continue in a flow path parallel and below the incoming slurry due to the force of gravity. Also of interest is Vernon E. Dudley U.S. Pat. No. 3,458,045 which discloses a grate device extending across the flow path of a downwardly angled duct section.

SUMMARY OF THE INVENTION

The improvements of the present invention relate to gravity flow separators wherein a solid-water slurry is fed into the upper end of a vertical chamber formed by a cylindrical screen which contains at the center thereof a stationary baffle which provides the slurry with an outward momentum by deflecting the slurry into contact with the screen whereby the water passes through the screen and the solids and remaining water retained in the chamber pass by gravity out of the bottom of the chamber. The device has particular use in dewatering plastic pellet-water slurries in which 95% of the water is removed. The stationary baffle for providing the outward momentum of the slurry is an X-shaped baffle plate which receives the high impact of the incoming slurry and directs the slurry toward the screen at a reduced velocity so that small pellets are not driven into the screen holes.

Accordingly, it is an object of the present invention to provide a novel dewatering screen which will remove a major portion of the liquid from a solid-liquid slurry and which eliminates the aforementioned problems of prior art separators.

In accordance with the foregoing object, an additional object of the present invention is to provide a separating screen adapted for the separations of solids as suspended or entrained in a liquid and which can be produced at a relatively small cost and yet perform an efficient separation without the use of moving parts.

An additional object of the present invention is to provide a pellet separator featuring a vertical, foraminous chamber and a slurry inlet to the dewatering chamber and which features a novel, stationary baffle positioned within the dewatering chamber to deflect the incoming slurry into the foraminous perimeter of the chamber at a controlled velocity in order to prevent the accumulation of solids within the holes of the foraminous chamber perimeter.

A further object of the present invention is to provide an improved type of separator featuring a vertical dewatering screen and a novel baffle which deflects the incoming flow of slurry into the screen for removal of the water from the slurry and a bottom dewatering screen which removes the major proportion of water remaining with the pellets not passing through the screen and falling to the bottom dewatering screen by gravity.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a transverse sectional view taken substantially through a plane indicated by sectional line 3—3 in FIG. 1.

DETAILED DESCRIPTION OF THE INVENTION

Figure 1:
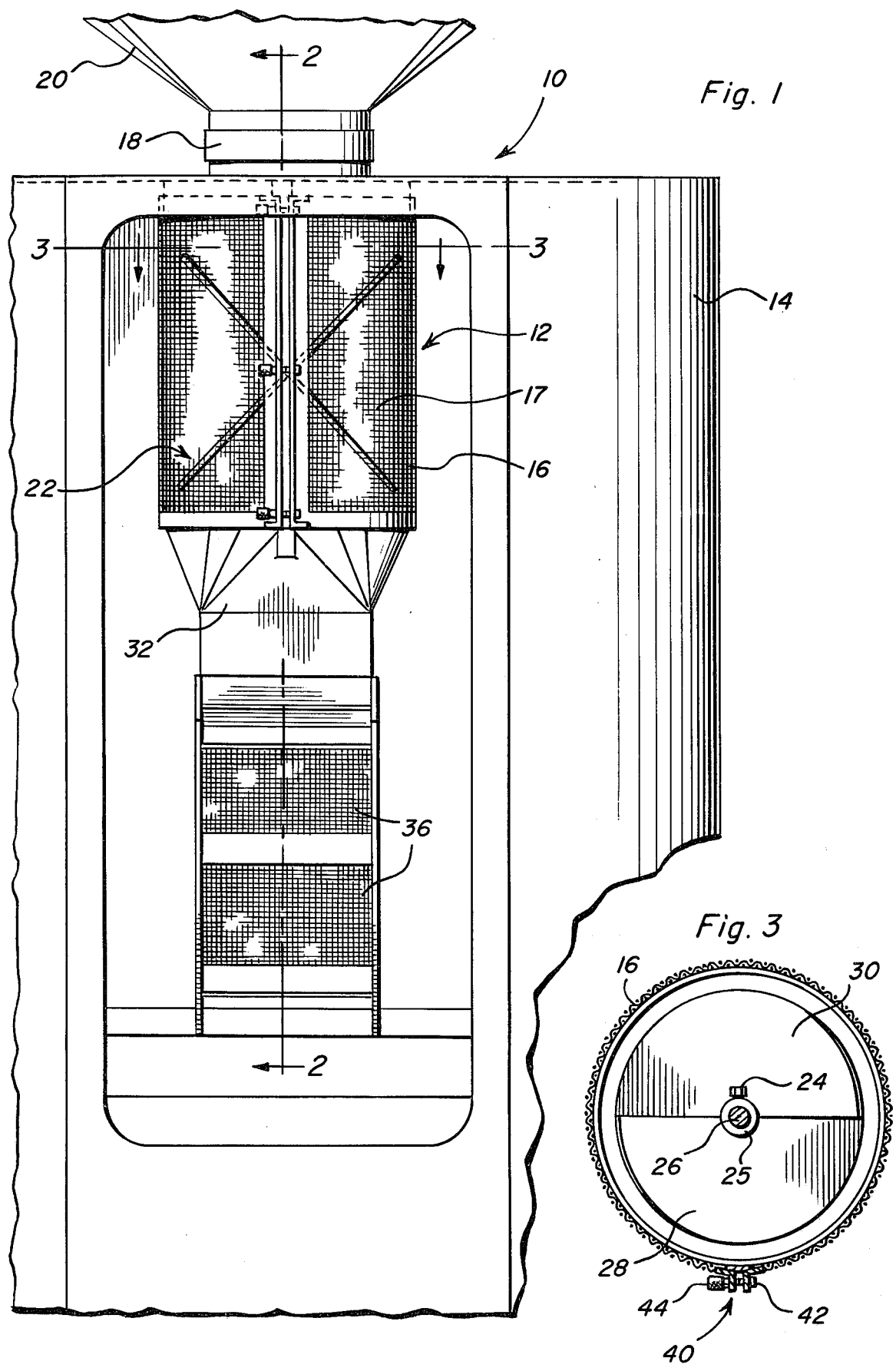
FIG. 1 is an elevational view of the dewatering screen of the present invention.
Figure 2:
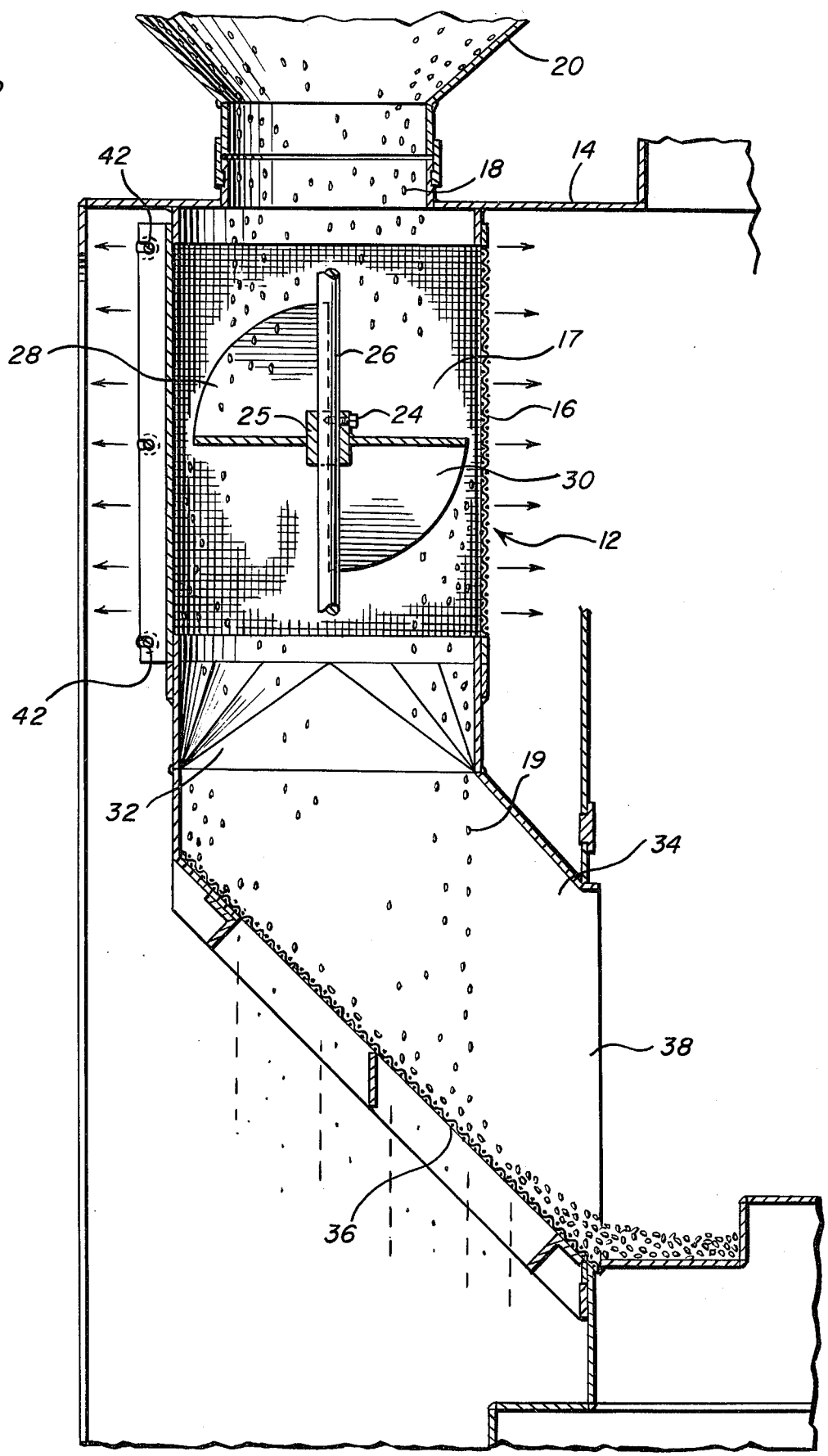
FIG. 2 is a longitudinal sectional view of the dewatering device taken substantially through a plane indicated by section line 2—2 in FIG. 1.

Referring to FIGS. 1-3, the separating device of the present invention is generally indicated by reference numeral 10. Separating device 10 can advantageously be used in association with a pellet drier in which device 10 is capable of removing up to about 95% of the water from a solid-liquid slurry, such as a plastic pellet/water slurry leaving the pellet forming machinery (not shown) Separating device 10 comprises the novel dewatering screen of the present invention generally indicated by reference numeral 12. Dewatering screen 12 is enclosed within a cylndrical casing 14 which can be rigidly supported upon a floor structure. Dewatering screen 12 comprises a vertical dewatering chamber 17 formed by the enclosure of cylindrical screen 16. Vertical dewatering chamber 17 is fed with the pellet/water slurry through gravity feed inlet 18 which receives slurry from hopper 20. Positioned within dewatering chamber 17 is X-shaped baffle 22 which deflects the incoming slurry from its vertical flow path to a flow path directed against cylindrical screen 16. Baffle 22 is stationary and supported within dewatering chamber 17 by passing locking means 24 through attachment surface member 25 and onto or into a stationary support surface or rod 26. The particular configuration of locking means 24 and support rod 26 is not critical so long as X-shaped baffle 22 is stationary and is secured so as to withstand the impact of the incoming slurry without being damaged so as to no longer deflect the slurry into cylindrical screen 16 for removal of the water. Baffle 22 is formed by the crossing of front and rear baffle members 28 and 30, respectively. Baffle members 28 and 30 present a flattened face to the incoming slurry and cross each other along the edge thereof on opposite sides of support rod 26. Each of the baffle members 28 and 30 extends substantially across the full diameter as well as the length of dewatering chamber 17 to provide an uninterrupted flow path along the full extent thereof and insure that substantially all of the incoming slurry is deflected into cylindrical screen 16. By deflecting the incoming slurry into at least two streams which contact different portions of cylindrical screen 16, the effective use of dewatering screen 12 is increased. Similarly, the length and position of each of the battle members 28 and 30 allows the baffle members to absorb the high impact of the incoming slurry and by deflecting the incoming slurry flow path approximately 45°, the velocity of the slurry within dewatering chamber 17 is reduced so that small pellets are not driven into the screen holes which would obviously decrease the separation efficiency.

In operation, the incoming slurry from inlet 18 flows by gravity into dewatering chamber 17 and impacts each baffle member 28 and 30 which form X-shaped baffle 22. Baffle 22 deflects the slurry into screen 16 whereupon the water passes through the holes of screen 16 and pellets 19 and remaining water which do not pass through the screen fall by gravity through outlet 32 into dewatering chute 34 which comprises a bottom dewatering screen 36 for removing a large portion of the remaining water. Water which has passed through cylindrical screen 16 can be collected within cylindrical casing 14 or directed to a collection box (not shown) positioned around cylindrical screen 16. Substantially dry pellets 19 flow by gravity along bottom screen 36 (approximately 95% of moisture removed after passing over screen 36) to dewatering chute outlet 38 whereupon pellets 19 are collected and either shipped or more likely conveyed to a pellet drying apparatus to remove all moisture therefrom.

One or more vertical screens 16 can be aligned in series for high slurry rates. Each vertical screen would contain X-shaped baffle 22 in order to deflect the slurry into the vertical dewatering screen. As shown in FIGS. 1 and 3, cylindrical screen 16 is formed by manipulating a rectangular screen into a circle and locking the free ends together by a plurality of joining means 40 such as a bolt 42 held within a threaded coupling 44. The particular structure of joining means 40 is not critical so long as the cylindrical shape of the dewatering screen is maintained. By forming the dewatering screen into a cylinder, a large effective screen area can be confined within a small space.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a device for separating solids from liquid in a slurry including a vertically disposed, elongated annular screen having a gravity slurry feed inlet and hopper communicating with the upper end thereof, an inclined screen having a portion underlying the lower end of said annular screen to receive solids and liquid after a substantial quantity of liquid has been removed by passing laterally through the annular screen with the inclined screen enabling passage of additional liquid downwardly therethrough while conveying solids laterally to further dewater the solids, that improvement comprising a baffle disposed in said annular screen, said baffle comprising a pair of imperforate baffle members supported centrally of said annular screen with each baffle having a straight inner edge and an outer edge conforming with the interior of the annular screen and a planar top surface, said outer edges being spaced from the inner surface of the annular screen, said straight inner edges of the baffle members extending generally diagonally of the annular screen and intersecting with each other adjacent the center of the annular screen thereby providing a pair of upwardly facing oppositely inclined flat surfaces on which the downwardly flowing slurry impinges with generally equal portions of the slurry flow stream being deflected toward opposite peripheral portions of the annular screen for passage of liquid therethrough and downward flow of solids between the inner surface of the annular screen and the lower edge portions of the baffle members onto the inclined screen.

2. The combination as defined in claim 1 wherein said annular screen is cylindrical in configuration, said baffle members having arcuate outer edges spaced from the inner peripheral surface of the cylindrical screen.

3. The combination as defined in claim 2 wherein said inclined screen includes a portion extending laterally of the cylindrical screen to discharge dewatered solids laterally of the lower end of the cylindrical screen.

4. The combination as defined in claim 2 wherein said cylindrical screen includes a vertically disposed rod oriented centrally thereof, said baffle members having their inner edges secured to said rod where the inner edges thereof intersect.

5. The combination as defined in claim 1 wherein said slurry includes water and plastic pellets received from an underwater pelletizer.

* * * * *